J. P. CLULEY.
ELECTRIC WELDING APPARATUS.
APPLICATION FILED JAN. 10, 1917.
1,221,512.
Patented Apr. 3, 1917.
2 SHEETS—SHEET 1.
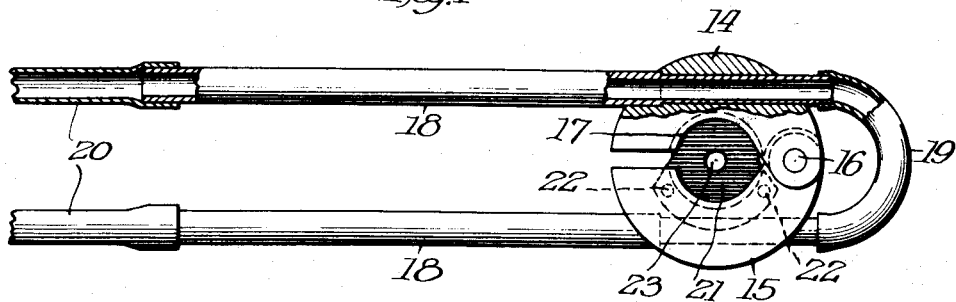
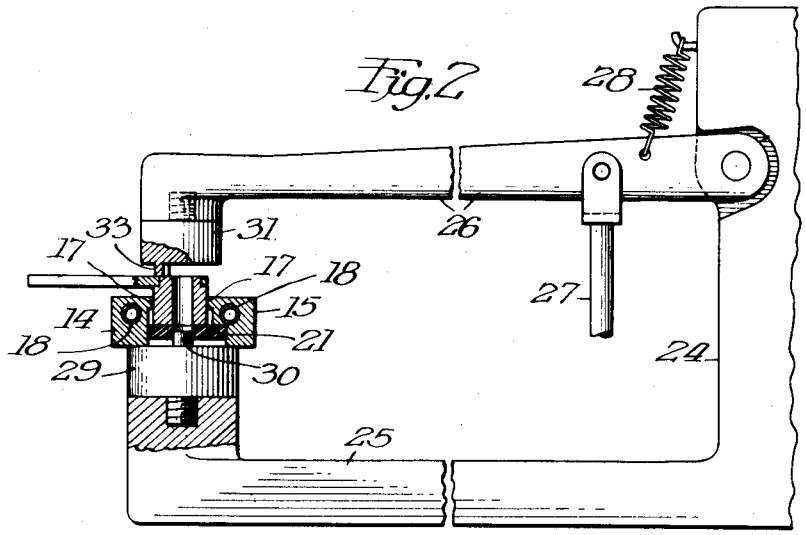
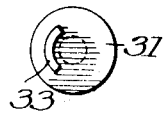
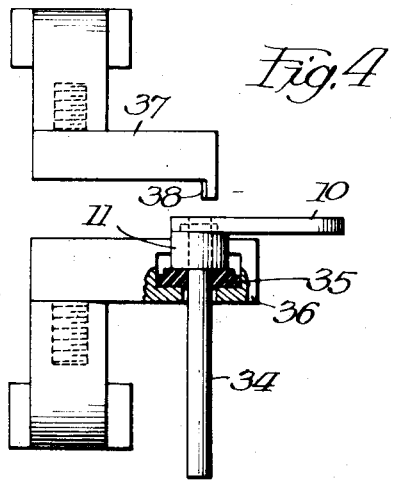
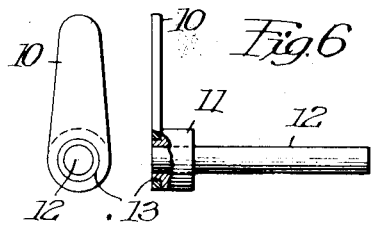
Witness:
Leonard W. Novander
Inventor
John P. Cluley
By George Bayard Jones
Atty

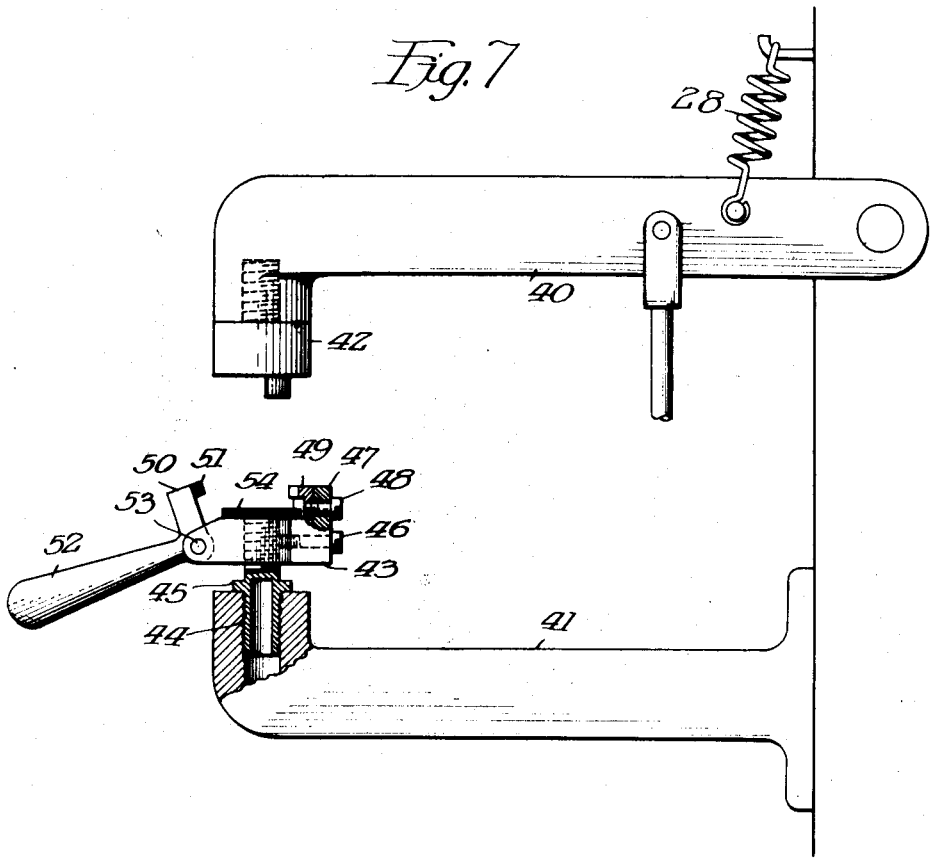

UNITED STATES PATENT OFFICE.

JOHN P. CLULEY, OF GREEN BAY, WISCONSIN.

ELECTRIC WELDING APPARATUS.

1,221,512.      Specification of Letters Patent.      Patented Apr. 3, 1917.

Application filed January 10, 1917. Serial No. 141,509.

*To all whom it may concern:*

Be it known that I, JOHN P. CLULEY, a citizen of the United States, residing at Green Bay, in the county of Brown and State of Wisconsin, have invented a certain new and useful Improvement in Electric Welding Apparatus, of which the following is a full, clear, concise, and exact description.

My invention relates to improvements in electric welding apparatus and the method of using the same and more particularly to an attachment or tool to be used in conjunction with a welding machine of some standard type.

The object of the invention is to provide a device of this character whereby the welding may be so controlled as to confine it to certain definite areas on the parts to be welded, leaving the other areas unaffected.

For the purpose of illustrating the invention, I shall describe apparatus adapted for electrically welding small steel arms to steel hubs, the hub having an opening accurately located with relation to the hole in the arm for receiving said hub, whereby it may be turned about a shaft, thus affording the arm a snug fitting, accurate and smooth bearing surface on the shaft on which it turns. Such arms are used in considerable numbers in computing machines. It will be apparent however, that the apparatus is not limited to the welding of computing machine parts, since similar members are used in small mechanisms of various kinds.

In the accompanying drawings, I have illustrated several embodiments of the invention.

Figure 1 is a plan view, partly in section, of the holding tool.

Fig. 2 is a side elevation of a portion of the welding machine with certain parts shown in section.

Fig. 3 is a bottom plan view of the upper electrode.

Fig. 4 is an elevation, partly in section, of a modified device.

Fig. 5 is an end view of the arm and hub after being welded together.

Fig. 6 is a side elevation thereof.

Fig. 7 is a side elevation of a welding machine having a modified form of holding tool thereon.

Fig. 8 is a bottom plan view of the upper electrode.

Fig. 9 is a plan view of the holding tool.

Figs. 10, 11 and 12 are top plan views of modified forms of the lower electrodes.

The parts to be welded consist in the present case of an arm 10 and a hub 11, each made preferably of steel. Said arm has a circular opening therein, accurately located with relation to other holes or pins thereon. Said opening receives the hub 11, whereby the central opening in said hub affords a greater wearing surface for the arm than would be afforded if the opening for the shaft were located directly in said arm. The hub also maintains said arm in its proper relation to the shaft without looseness or vibration. The central opening in said hub is accurately located with relation to the flange that enters the opening in the arm 10, thereby accurately maintaining said arm in the proper position with respect to said shaft. During the welding operation, the parts are held by suitable means, comprising a tool or holder having a pair of pivoted members 14, 15, made of conducting material, preferably copper, and pivoted at 16, whereby they may be opened and shut like a pair of pincers. Each is provided with a flange 17, which flange is adapted to clamp against the hub and thereby establish electrical contact therewith, said contact being confined to a limited area in the parts shown, preferably on the periphery of the hub and close to the surface which contacts with the arm. The parts are moved toward and away from each other by means of a pair of hollow handles 18, which pass therethrough and are connected at one end by a flexible tube 19, whereby water may be circulated therethrough for cooling purposes, the water being supplied from any source to one of the tubes 20, the other tube 20 being the outlet.

A plate of insulating material 21 is secured to one of the pivoted members, for example the member 15, being secured thereto by screws 22 or other fastening device, said plate having a central opening 23.

The tool may be used in conjunction with a welding machine of any suitable type consisting, for example, of a suitable standard 24 having a fixed lower arm 25 and a pivoted upper arm 26, which may be lowered by means of a link 27 against the action of a spring 28. The lower arm has a suitable electrode 29 mounted thereon constituting one terminal of the welding circuit, said electrode having a central projection 30.

The upper arm also has an electrode 31 secured thereto constituting the other terminal of the welding circuit. Said upper electrode has an arc-shaped projection 33 thereon. The hub 11 is firmly gripped between the members 14, 15, and the tool as a whole is then placed on the lower electrode, the projection 30 entering the opening 23 in the insulating plate and serving to center the device and particularly the hub. Said insulating plate prevents downward movement of the hub beyond a predetermined point, and serves further to insulate said hub from direct contact with the lower electrode. The upper arm is then lowered causing the projection 33 to bear against the arm 10, thereby closing the circuit through said arm and said hub and welding the two together along a predetermined area corresponding in general to the arc-shaped contact 33. The tool may then be turned about the pivot 30 if desired, to weld the parts together along further arc-shaped areas. For most purposes, it is sufficient to weld the parts along two diametrically opposed areas. It will be noted that the welding is localized or confined to predetermined areas. The path of the current through the hub is mainly near the outer wall thereof, whereby undue heating of the wall of the opening therethrough is avoided. This is an important feature, as said opening constitutes a bearing, the surface and center of which should remain accurate and unaffected by the welding operation to avoid the necessity for further reaming. For similar reasons, it is desired to avoid undue heating of the wall of the opening in the arm.

In cases where the arm and hub do not turn on the supporting shaft, but are to be integrally united therewith, and the whole turned with the shaft itself as the bearing surface, the apparatus may be modified to receive the shaft and weld all three parts simultaneously. Such modified apparatus is shown in Fig. 4, in which the arm and the hub are fitted over the shaft 34. The insulating bushing 35 is modified so as to support the hub out of electrical contact with the lower electrode 36 and also to hold the shaft 34 out of contact therewith. The upper electrode 37 has a central projection 38 which contacts with the upper end of the shaft 34, whereby the current traverses the upper end of the shaft 34 and the upper end of the hub 11 to the adjacent part of the arm 10, whereby the welding heat is confined mainly to the upper part of said hub and contiguous parts, and welds all three parts together. The upper electrode 37 and the lower electrode 36 project laterally from their respective supporting arms, as shown.

Although the tool has been described as a separate device removable from the electrodes, it is apparent that it may constitute substantially a fixed part of the welding machine and in Fig. 7 it is so illustrated. In this figure the upper and lower arms 40—41 respectively, constitute parts of a welding machine, as in the previous cases. The upper arm has an electrode 42 carried thereby and the lower arm has a tool or work holder 43 permanently mounted thereon. Said tool holder is mounted on a tubular screw-threaded member 44 having a shoulder 45 which is screwed down against its support. A set screw 46 locks the member 43 to its tubular support 44. Said member has a shoulder 47 thereon which receives a stud 48, the latter serving to secure a contact member 49 in place. At the opposite side of the work holder, an arm 50 is mounted, having a projection 51 thereon, said projection serving with the contact member 49 to clamp the parts to be welded between them. This clamping is effected by means of a handle 52 formed integrally with the arm 50 and turning about a pivot 53. The parts to be welded are supported on a projecting base 54.

The contact member 49 is shaped to conform to the member clamped thereby. It may therefore have any desired configuration. Several different forms of this member 55, 56, 57 are illustrated in Figs. 10, 11 and 12 respectively.

In welding arms to hubs heretofore, it has been necessary to drill holes through said arm and hub and insert pins which are riveted over to maintain the parts in place. By the use of the apparatus described herein, the cost of assembling the arms on their hubs is greatly reduced by the omission of these pins and the labor of drilling the holes. Said hubs and arms may be very readily handled and firmly held together in such a way as to effect the welding without injuring the bearing surface of the hub.

As previously stated, the device may be used for welding parts other than those specifically described herein, and furthermore, various changes may be made in the details and relative arrangement of the parts, whereby the field of application of the device is greatly extended. I do not limit myself therefore, to the structural details of the present apparatus, except where limitations are imposed in the appended claims.

Having thus described my invention, what I claim as new and desire to secure by Letters Patent of the United States is:

1. A work holder for electrical welding machines, comprising members adjustable about one of the parts to be welded and having means for confining the welding current to a predetermined portion thereof in combination with means for applying current to another of said members also at a predetermined area thereof.

2. A work holder for electrical welding machines, comprising means for holding one of the parts to be welded, means for pressing another of said parts against said first part, and means for positioning said first part on the welding machine, said holding and pressing means serving also to confine the welding current to a predetermined portion of said parts.

3. A work holder for electrical welding machines, comprising a pair of pivoted members each having a flange thereon constituting an electrical conducting member, a pair of handles for moving said members, and an insulating member for limiting the position of the work in said clamping members.

4. A work holder for electrical welding machines, comprising a pair of semi-circular conducting members pivoted together at one end, an insulating plate carried by one of said members, hollow handles passing through said members, and means connecting said handles to permit a cooling fluid to flow therethrough.

5. A tool holder for an arm and a hub comprising clamping members arranged to embrace said hub on a limited area only, an electrode which supports said tool holder and centers the same, and a second electrode conforming to the area on the arm which it is desired to weld, said electrode being arranged to press said arm against said hub during the welding operation.

6. A tool holder comprising a pair of semi-circular conducting members, a pin about which said members are pivoted, an insulating plate secured within a recess in said members, a flange on each member constituting contact areas, an electrode having a central projection fitting within an opening in said insulating plate, a second electrode having an arc-shaped projection thereon, and means for moving said electrodes toward each other in contact with the work contained in said holder.

7. Electric welding apparatus comprising means for holding the parts to be welded and means for applying the welding current to a definite portion of one of said parts to insure a welding heat at a predetermined area, without unduly heating the adjacent area.

8. Electric welding apparatus comprising means for holding the parts in contact and means for applying the welding current to a surface of one of said parts arranged substantially at right angles to the plane of the contact areas of the parts to be welded.

9. The method of electrically welding parts other than thin sheet metal, which consists in making an electrical contact with a definite area of one of said parts and with an area at right angles thereto on another of said parts.

In witness whereof, I hereunto subscribe my name.

JOHN P. CLULEY.